United States Patent [19]

Kawamoto

[11] Patent Number: 4,485,695
[45] Date of Patent: Dec. 4, 1984

[54] CONTROL APPARATUS FOR AUTOMATIC TRANSMISSIONS

[75] Inventor: Mutsumi Kawamoto, Nagoya, Japan

[73] Assignee: Aisin-Warner Kabushiki Kaisha, Aichi, Japan

[21] Appl. No.: 473,973

[22] Filed: Mar. 10, 1983

Related U.S. Application Data

[63] Continuation of Ser. No. 147,308, May 6, 1980.

[30] Foreign Application Priority Data

May 10, 1979 [JP] Japan .................. 54-57734

[51] Int. Cl.$^3$ .................. F16H 3/74; B60K 41/08
[52] U.S. Cl. .................. 74/869; 74/868; 74/866; 74/752 A; 74/752 C
[58] Field of Search .................. 74/869, 868, 867, 865, 74/752 C, 752 A, 866

[56] References Cited

U.S. PATENT DOCUMENTS

| | | | |
|---|---|---|---|
| 3,593,599 | 7/1971 | Dach | 74/869 |
| 3,683,721 | 8/1972 | Uozumi et al. | 74/868 X |
| 3,747,439 | 7/1973 | Uozumi et al. | 74/869 |
| 3,968,707 | 7/1976 | Dach | 74/869 |
| 4,008,630 | 2/1977 | Murakami et al. | 74/869 |
| 4,129,051 | 12/1978 | Shindo et al. | 74/867 |
| 4,143,563 | 3/1979 | Shindo et al. | 74/869 X |
| 4,148,232 | 4/1979 | Moriya | 74/865 |
| 4,186,627 | 2/1980 | Kuramochi | 74/869 |
| 4,334,441 | 6/1982 | Iwanaga et al. | 74/869 X |
| 4,346,626 | 8/1982 | Kawamoto | 74/867 X |
| 4,346,627 | 8/1982 | Kawamoto et al. | 74/868 X |
| 4,367,812 | 1/1983 | Kobayashi et al. | 74/867 X |

FOREIGN PATENT DOCUMENTS

| | | | |
|---|---|---|---|
| 2744286 | 4/1979 | Fed. Rep. of Germany | 74/869 |
| 3017894 | 11/1980 | Fed. Rep. of Germany | 74/869 |
| 0060747 | 5/1980 | Japan | 74/869 |
| 0103149 | 8/1980 | Japan | 74/869 |
| 0149455 | 11/1980 | Japan | 74/869 |
| 0149454 | 11/1980 | Japan | 74/869 |
| 2036894 | 7/1980 | United Kingdom | 74/869 |
| 2067688 | 7/1981 | United Kingdom | 74/869 |

Primary Examiner—Allan D. Herrmann
Assistant Examiner—Stephen B. Andrews
Attorney, Agent, or Firm—Oblon, Fisher, Spivak, McClelland & Maier

[57] ABSTRACT

The automatic transmission control apparatus includes a single dual sequence valve in the hydraulic control circuit which provides timing control functions for engaging the brakes, engaging the brakes and one-way clutch, and operating the dual pistons operatively associated with the clutch, thereby preventing overheat of the friction engagement elements, improving the shifting of the gears through the speed range, and simplifying the hydraulic control circuit arrangement.

8 Claims, 6 Drawing Figures

CONTROL APPARATUS FOR AUTOMATIC TRANSMISSIONS

This application is a continuation of application Ser. No. 147,308, filed May 6, 1980.

BACKGROUND OF THE INVENTION

1. Field of the Invention

The present invention relates to improvements in or to a control apparatus for hydraulically operated automatic multiple-speed transmissions for use in vehicles.

2. Description of the Prior Art

In the conventional hydraulically-controlled automatic transmissions which provide three forward gear ratios, for example, an intermediate gear, or second speed, is provided by engaging the following elements: one one-way clutch $F_1$, a brake $B_2$ acting on the clutch $F_1$, a brake $B_1$ for acting on the engine brake or compensating for insufficient capacity of the aforementioned clutch $F_1$, and a forward clutch $C_1$. Shifting gear ratios from the first to second speed takes place by engaging the brake $B_2$ to enable the transmissions to be synchronized with the second speed, and completed by later engaging the brake $B_1$. Shifting down from the third to second speed is completed by first engaging the one-way clutch $F_1$ securely held by the brake $B_2$ and by then engaging the brake $B_1$. To control the timing at which the brake $B_1$ is to be engaged for upshifting first to second and for downshifting third to second. Individual sequence valves are provided within the hydraulic control circuit. If the reverse clutch $C_2$ which engages for changing to reverse gears is equipped with a dual piston assembly including an inner piston and an outer piston, an additional individual sequence valve is required to control the timing for the operating sequence of the two pistons.

SUMMARY OF THE INVENTION

One object of the present invention is to provide an automatic transmission control which includes a single dual sequence valve which performs the functions of the two or more individual sequence valves mentioned above, and which permits a simple construction and less costly hydraulic circuit to be manufactured.

The above object of the present invention can therefore be attained by the improvement in or to the automatic transmission control apparatus of the type including a multi-speed shifting mechanism having a plurality of transmission gear sets and a plurality of friction engaging devices for engaging or disengaging members of the gear set so that at least three forward speeds and a reverse speed are accomplished with the forward speeds including a low speed, a middle speed and a high speed. This type of control apparatus also has a hydralic control device for controlling by way of engaging or disengaging, the friction engaging devices in accordance with input signals to accomplish the forward multi-speeds and the reverse speed with the hydralic control device including an oil pressure source and a plurality of shift valves for accomplishing the speeds by selectively feeding and exhausting oil pressure from the oil pressure source to the friction engaging devices in response to input signals of the vehicle running conditions including both vehicular speed and throttle opening. The inprovement according to the present invention includes the fact that the plurality of friction engaging devices have a first friction engaging mechanism controllable to engage or disengage so as to accomplish the high speed as well as a second friction engaging mechanism which is controllable to be engaged or disengaged to accomplish the middle speed. A one-way clutch, which is locked at a middle speed and released at high speed is included along with a third friction engaging mechanism which is connected parallel with the second friction engaging mechanism and controllable to be engaged or disengaged to accomplish middle speed through the one-way clutch. Furthermore, the hydraulic control device has a sequence valve for controlling, by feeding or exhausting, a second engaging oil pressure in order to engage or disengage the second friction engaging mechanism with the sequence valve including a valve element as well as a first oil chamber in which the valve element is pushed so as to feed the second engaging oil pressure to the second friction engaging mechanism by applying a third engaging oil pressure for controlling the third friction engaging mechanism to be either engaged or disengaged. A second oil chamber is included in which the valve element is pushed so as to release the second friction gauging mechanism upon exhausting the second engaging oil pressure by applying the first engaging oil pressure for controlling the first friction engaging mechanism to be either engaged or disengaged as well as a biasing means for biasing the valve elements so as to exhaust the second engaging oil pressure. The mechanism is provided so that when the device is shifted up from the low speeds to the middle speed, the valve element is actuated towards the feeding of the second engaging oil pressure to be second friction engaging mechanism when the third engaging oil pressure has arrived at the level permitting the third friction engaging mechanism to engage. On the downward shifting from the high speed to the middle speed the valve element is actuated toward feeding the second engaging oil pressure to the second friction engaging mechanism when the first engaging oil pressure has arrived at a level permitting the first friction engaging mechanism to release and the one-way clutch locks.

DETAILED DESCRIPTION OF THE PREFERRED EMBODIMENTS

Figure 1:
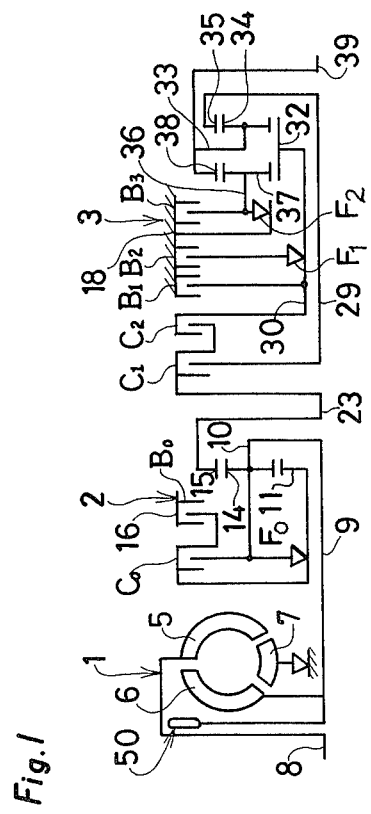
FIG. 1 is a schematic diagram illustrating the automatic transmission arrangement.

FIG. 1 is a schematic view of an example of the overdrive-equipped fluid-operated automatic transmissions controlled by the hydraulic control apparatus according to the present invention. The automatic transmissions include a torque converter with a directly coupling clutch, an overdrive unit 2 and a transmission gear unit 3 which provides three forward speeds and one reverse speed. The torque converter 1, which is known per se, includes a pump 5, a turbine 6 and a stator 7, the pump 5 being connected to an engine crankshaft 8, and the turbine 6 being connected to a turbine shaft 9. The turbine shaft 9 provides an output shaft for the torque converter 1 and also provides an input shaft for the overdrive unit. The turbine shaft 9 is connected to a carrier 10 of planetary gears. A direct coupling clutch 50 is interposed between the engine crankshaft 8 and turbine shaft 9, and is operated for mechanically connecting the crankshaft 8 with the turbine shaft 9. A planetary pinion 14 rotatably supported by the carrier 10 engages a sun gear 11 and a ring gear 15. An overdrive multi-plate clutch $C_0$ and an overdrive one-way clutch $F_0$ are interposed between the sun gear 11 and the carrier 10, and an overdrive multi-plate brake $B_0$ is interposed beween the sun gear 11 and a housing or overdrive casing 16 which accommodates the overdrive unit.

The ring gear 15 in the overdrive unit is connected to the input shaft 23 of the transmission gears 3. A front multi-plate clutch $C_1$ is provided between the input shaft 23 and counter shaft 29, with a reverse multi-plate clutch $C_2$ disposed between the input shaft 23 and sun gear shaft 30. A multi-plate brake $B_2$ is provided by way of the multi-plate brake $B_1$ and one-way clutch $F_1$ between the sun gear shaft 30 and transmission case 18. A sun gear 32 fixed to the sun gear shaft 30 forms two trains of planetary gears, one including a carrier 33, a planetary pinion carried by the carrier and a ring gear 35 in mesh with the pinion, and the other gear train including a carrier 36, a planetary pinion 37 carried by the carrier and a ring gear 38 in mesh with the pinion. The ring gear 35 in one of the gear trains is connected to the counter shaft 29. The carrier 33 in this gear train is linked to the carrier 38 in the other gear train. The carriers and ring gear are connected to the output shaft 39. A multiplate brake $B_3$ and a one-way clutch $F_2$ are provided between the carrier 36 in the other gear train and the transmission case 18.

The fluid-operated automatic transmission described above is controlled by the hydraulic control which will be described later so that each clutch and brake can be engaged or disengaged according to the engine output changes and cruising speeds of the automobile, thus providing the corresponding shifts of four forward speeds including overdrive speed (O/D) or a manually switched shifting to a reverse gear.

Transmission gear positions and brake operations are shown in Table 1.

TABLE 1

| Shift positions | | clutch $C_0$ | clutch $C_1$ | clutch $C_2$ | brake $B_0$ | brake $B_1$ | brake $B_3$ | clutch $B_2$ | one-way clutch $F_0$ | one-way clutch $F_2$ | one-way $F_1$ |
|---|---|---|---|---|---|---|---|---|---|---|---|
| Parking (P) | | o | x | x | x | x | o | x | | | |
| Reverse (R) | | o | x | o | x | x | o | x | lock | lock | |
| Neutral (N) | | o | x | x | x | x | x | x | | | |
| Forward D range | 1st | o | o | x | x | x | x | x | lock | lock | over-run |
| | 2nd | o | o | x | x | o | x | o | lock | over-run | lock |
| | 3rd | o | o | o | x | x | x | o | lock | over-run | over-run |
| | O.D | x | o | o | o | x | x | o | over-run | over-run | over-run |
| 3 range | 1st | o | o | x | x | x | x | x | lock | lock | over-run |
| | 2nd | o | o | x | x | o | x | o | lock | over-run | lock |
| | 3rd | o | o | o | x | x | x | o | lock | over-run | over-run |
| 2 range | 1st | o | o | x | x | x | x | x | lock | lock | over-run |
| | 2nd | o | o | x | x | o | x | o | lock | over-run | lock |
| L range | | o | o | x | x | x | o | x | lock | lock | over-run |

In the above table, a symbol (O) indicates that the appropriate clutch or brake is engaged, and a symbol (X) indicates that the appropriate clutch or brake is disengaged.

Figure 2:
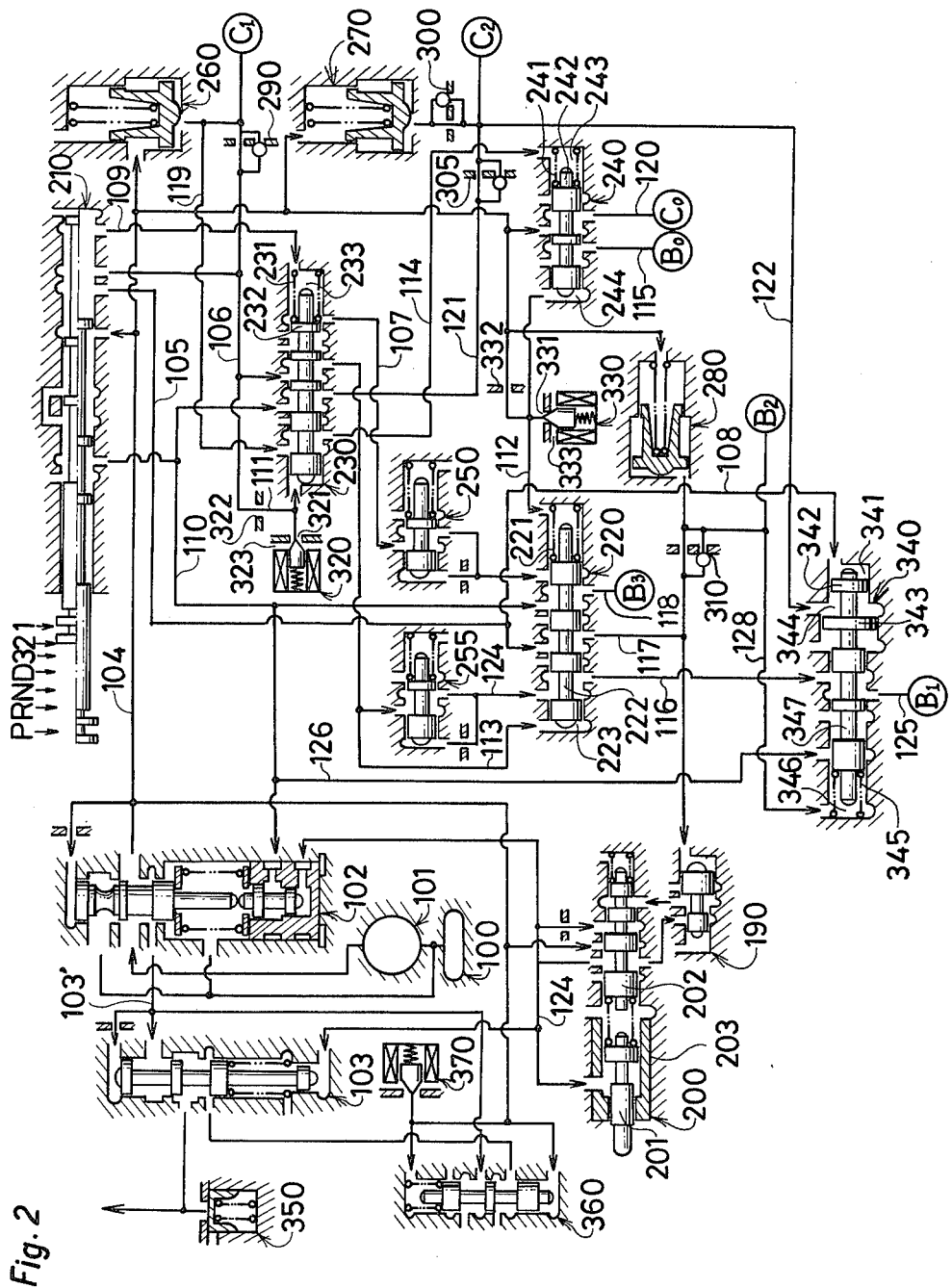
FIG. 2 is a hydraulic circuit diagram of the automatic transmission control apparatus according to the present invention.

FIG. 2 illustrates a preferred embodiment of the fluid circuit in the hydraulic control apparatus according to the present invention, which permits an automatic or manual shifting of gears by selectively operating the clutches $C_0$, $C_1$, $C_2$, and brakes $B_0$, $B_1$, $B_2$, $B_3$ of the automatic transmissions, and the direct-coupling clutch 50 of the torque converter. In FIG. 2, the fluid circuit includes an oil tank 100, oil pump 101, pressure regulating valve 102, auxiliary pressure regulating valve 103, cutback valve 190, throttle valve 200, manual valve 210, 1-2 shift valve 220, 2-3 shift valve 230, 3-4 shift valve 240, low coast modulator valve 250, intermediate coast modulator valve 255, accumulator valves 260, 270, 280, check valve-incorporated flow control valves 290, 300, 305, 310, solenoid valves 320, 330, dual sequence valve 340, cooler bypass valve 350, lock-up clutch control valve 360, lock-up control solenoid valve 370, oil passages between the above-mentioned valves and passages for supplying servo-controlled pressure oil to the clutches, brakes, and other transmission elements.

Operating oil which is drawn by the oil pump 101 from the oil tank 100 is introduced into the pressure regulating valve 102, which regulates oil to a predetermined pressure or line pressure, the regulated oil being branched into the oil passage 104 and oil passage 103'. The oil through the passage 103' is introduced into the auxiliary pressure regulating valve 103, which provides torque converter pressure, lubricating pressure and cooler pressure which are regulated to predetermined values depending upon the throttle pressures of the throttle valve 200. The manual valve 210 connected to the oil passage 104 is operatively associated with a shift lever at a driver seat. Operating the shift lever manually brings the manual valve 210 to positions P, R, N D, 3, 2, and L depending upon the positions in the shift lever range. Table 2 summarizes the relationships between oil passage 104 and oil passages 105, 106, 109, 110 at each of the shift lever posiitons. The symbol (O) indicates that the oil passage communicates with the appropriate oil passages.

TABLE 2

|  | P | R | N | D | 3 | 2 | L |
|---|---|---|---|---|---|---|---|
| oil passage 105 |  |  | o | o | o | o | o |
| oil passage 106 |  |  |  | o | o | o | o |
| oil passage 109 |  |  |  |  |  |  | o |
| oil passage 110 |  | o |  |  |  |  |  |

The first solenoid valve 320 which controls the 2-3 shift valve 230 has its opening 321 closed when it is not energized, causing oil to be pressurized in the oil passage 111 communicated through an orifice 322 with the oil passage 106. Energizing the valve 230 causes its opening 321 to open, allowing the pressurized oil in the passage 111 to be drained from a drain port 323. The second solenoid valve 330 which controls the 1-2 shift valve 220 and 3-4 shift valve 240 has its opening 331 closed when it is not energized, causing oil to be pressurized in the oil passage 112 communicated through an orifice 332 with the oil passage 104. Energizing the valve 330 causes its opening 331 to open, allowing the pressurized oil in the passage 112 to be drained from a drain port 333. Table 3 shows the relationships between the status of the solenoid valves 320 and 330 which are energized or deenergized under control of the electronic circuit later to be described, and the corresponding shifting to four speeds in the automatic transmission.

TABLE 3

| Manual valve shift positions | N | D | | | |
|---|---|---|---|---|---|
| gear shifts |  | first | second | third | fourth |
| 1st solenoid valve | OFF | ON | ON | OFF | OFF |
| 2nd solenoid valve | OFF | ON | OFF | ON | ON |

The 1-2 shift valve 220 has a spool 222 backed by a spring 221, and in first speed, or low gear, the solenoid valve 330 is energized, allowing oil pressure to be removed from the oil passage 112 which sets the spool 222 to the right position in FIG. 2 under the oil pressure supplied through oil passage 113 to the oil chamber 223 at the right end. In second speed or gear, the solenoid valve 330 is deenergized, producing oil pressure in the oil passage 112 which sets the spool 222 to the left position in the figure. In third and fourth speeds, the spool 232 in the 2-3 shift valve which will be described later is set to the right position in the figure, causing oil pressure to be removed from the oil chamber at the left end through oil passage 113, which results in setting the spool 222 to the left position.

The 2-3 shift valve 230 has a spool 232 backed by a spring 231. In first and second speeds, the solenoid valve 320 is energized with no oil pressure in the oil passage 111, allowing the spring 231 to move the spool 232 to the left position. In third and fourth speeds, the solenoid valve 320 is deenergized, producing oil pressure in the passage 111 which sets the spool 232 to the right position.

The 3-4 shift valve 240 has a spool 242 backed by a spring 241, and in first and second gears, a line pressure is drawn into an oil chamber 243 through oil passage 114, setting the spool 242 to the left position. In third and fourth speeds, oil pressure is removed from the oil passage 114; in third speed, the solenoid valve 330 is also energized with oil pressure removed from oil passage 112, causing the spring 241 to urge the spool 242 toward the left setting position; and in fourth speed, the solenoid valve 330 is deenergized with oil pressure developped in the passage 112, setting the spool to the right position.

The throttle valve 200 is actuated in response to the downward or depressed stroke of the accelerator pedal, causing the corresponding stroke in the indicator valve 201 to take place, which in turn compresses a spring 203 between the valve 201 and a valve spool 202, producing throttle pressure in the oil passage 124.

With the manual valve 210 at N position, the solenoid valve 330 is deenergized and there is oil pressure in the oil passage 112, introducing oil pressure into the left-end oil chamber 244 of the 3-4 shift valve 240 whose spool 242 is set to the right position. In this condition, the 3-4 shift valve 240 allows a communication between oil passages 104 and 115, and the brake $B_0$ is engaged; the oil passage 120 is communicated to the draim port from which the oil pressure is removed, and the clutch $C_0$ is released; and the overdrive unit 3 has its overdrive gears in mesh.

Manually shifting the manual valve 210 to R position produces oil pressure in the oil passage 110, introducing oil pressure into the right oil chamber 243 of the 3-4 shift valve by way of the 2-3 shift valve 230 with the spool 232 set to the left position and through the oil passage 114. Thus, for about one second when the manual valve 210 is changed from N to R position, the overdrive gears in the overdrive unit 2 are kept in mesh and the reverse gears in the planetary gear train 3 are engaged. One second after the shifting from N to R, the oil chamber 243 has a rising oil pressure, moving the spool 242 to the left position to allow the oil passage 104 to communicate with the oil passage 120 which introduces oil pressure into the clutch $C_0$ while removing oil pressure from the oil passage 115, so that the brake $B_0$ is released and the clutch $C_0$ is engaged. The gears in the overdrive unit 2 are thus directly coupled to the drive shaft, and the planetary gear unit is thus brought to a normal reverse gearing.

For shifting from N to D manually, in first speed, the spool 222 in the 1-2 shift valve 220 is placed in the right position, removing oil pressure from oil passages 116 and 117 linked to the brakes $B_1$ and $B_2$ and removing oil pressure from the oil passage 118 linked to the brake $B_3$ so that the brakes $B_1$, $B_2$ and $B_3$ are released.

In first speed, the dual sequence valve 340 has a line pressure in its right oil chamber 341 which is provided through the oil passage 108 as a branch of the oil passage 105, the line pressure causing the spring 345 at the back of the spool 347 to be compressed to move the spool 347 to the left position.

When the car reaches a preset speed, the output signal from the computer circuit causes the solenoid valve 330 to be deenergized, moving the spool 222 in the 1-2 shift valve 220 to the left position to allow a line pressure from oil passages 105 and 117 to gradually engage the brake $B_2$ through a flow control valve 310 and an accumulator 280, the line pressure being also introduced through the oil passage 128 into the left oil chamber 346 of the dual sequence valve 340. The sum of the force of the spring 345 and the gradually increasing oil pressure in the oil chamber 346 reaches a valve greater than the line pressure on a land 342 until the spool 347 begins to be moved toward the right position. After a preset period of time elapses, the spool 347 is then moved to the right position. As the solenoid valve 320 is then energized to place the spool 232 in the 2-3 shift valve 232 in the left position, oil pressure is introduced into the brake $B_1$ through the route of oil passage 106→2-3 shift valve 230→oil passage 113→intermediate coast modulator valve 255→oil passage 124→1-2 shift valve 220→oil passage 116→dual sequence valve 340→oil passage 125, causing the brake $B_1$ to be engaged. This causes a shifting to second speed in which the engine brake becomes effective. At this time, the dual sequence valve 340 provides a timing control which permits the brake $B_1$ to be engaged after the transmission is shifted to second speed by engaging the brake $B_2$.

The shifting to third speed is accomplished in the following manner: the output provided by the computer circuit in response to certain throttle position and vehicle speed deenergizes the solenoid valve 320, moving the spool 232 in the 2-3 shift valve 230 to the right position to allow oil pressure to be introduced through oil passage 106 and 121 and flow control valve 305 into the clutch $C_2$ for engagement, while removing oil pressure from the oil chamber 223 which causes the spring 221 to lock the spool 222 of the 1-2 shift valve 220 in the left position.

In this third speed, the oil chamber 344 in the dual sequence valve 340, which is defined by the land 342 and a land 343 of a predetermined diameter greater than the land 342, has oil pressure introduced from the oil passage 122 branched from the oil passage 121 so that the spool 347 can be moved to the left position, allowing the oil passage 125 to communicate with the drain port from which oil goes out, thus releasing the brake $B_1$.

The shifting to fourth speed is done in the manner in which the output provided by the computer circuit as above renders the solenoid valve 330 nonconductive, causing the spool 242 in the 3-4 shift valve to move to the right position to allow oil pressure to be removed from oil passage 120 with oil pressure introduced into oil passage 115, releasing the clutch $C_0$ and engaging the brake $B_0$.

The downshifting from fourth to third speed is accomplished in the reverse sequence to that of the upshifting from third to fourth speed as discussed above, that is, by energizing the solenoid valve 330 so that the spool 242 in the 3-4 shift valve 240 is moved to the right position, allowing oil pressure to be removed from oil passage 115 while introducing oil pressure into oil passage 120, thereby releasing the brake $B_0$ and engaging the clutch $C_0$. For the downshifting from third to second speed, energizing the solenoid valve 320 causes the spool 232 in the 2-3 shift valve 230 to be moved to the left position, allowing oil pressure to be removed from the oil passage 121 for releasing the clutch $C_2$, followed by engaging the one-way clutch $F_1$. When the one-way clutch $F_1$ has completely been engaged, oil pressure is removed from the oil passage branch 122 of the oil passage 121 as well as from the oil chamber 344 linked to the passage 122, causing the spool 347 in the dual sequence valve 340 to be moved to the right position against the oil pressure in the chamber 346 introduced from oil passage 128 and the oil pressure applied on the land 342 by the resilient action of the spring 345. This causes the oil passage 125 to be communicated to the oil passage 116, engaging the brake $B_1$. In this case, the dual sequence valve 340 provides a timing control for engaging the one-way clutch $F_1$ and engaging the brake $B_1$.

With the manual valve 210 at position 3, the shifting to first, second and third speeds is done in the same manner as in the D position as earlier described, but the shifting to a fourth speed does not take place because a line pressure, which is introduced in the right chamber 243 of the 3-4 shift valve from the oil passages 106 and 114, causes the spool 242 to be locked in the left position. If the manual valve 210 is manually operated to shift from D to 3 while the car is running in fourth gear with the valve 210 at D position, the downshifting to third speed takes place immediately.

When the manual valve 210 is placed at position 2, a shifting to first speed takes place in the same manner as at D position. In second speed, oil pressure from oil passages 106 and 116 causes the brake $B_1$ to be engaged, making the engine brake work effectively. If manual shifting to position 2 takes place when the car is cruising in third gear, the computer circuit responds to a vehicle-speed loss down to a certain value, providing output which energizes the solenoid valve 320 to cause a downshifting from 3 to 2 to take place.

When the manual valve 210 is shifted to L position, oil pressure is introduced into the oil passage 109, producing a line pressure in the right oil chamber 233 of the 2-3 shift valve 230 causing the spool 232 to be locked in the left position and thus immediately causing a downshift from 3 to 2 to take place. The downshifting from 2 to 1 takes place when output provided by the computer circuit in response to a certain vehicle speed loss disables the solenoid valve 330 to be nonconductive. At the same time, the oil pressure in the oil passage 109 is introduced through oil passage 107, low coast modulator valve 250, and oil passages 123 and 118 into the brake $B_3$ for engagement.

Figure 3:
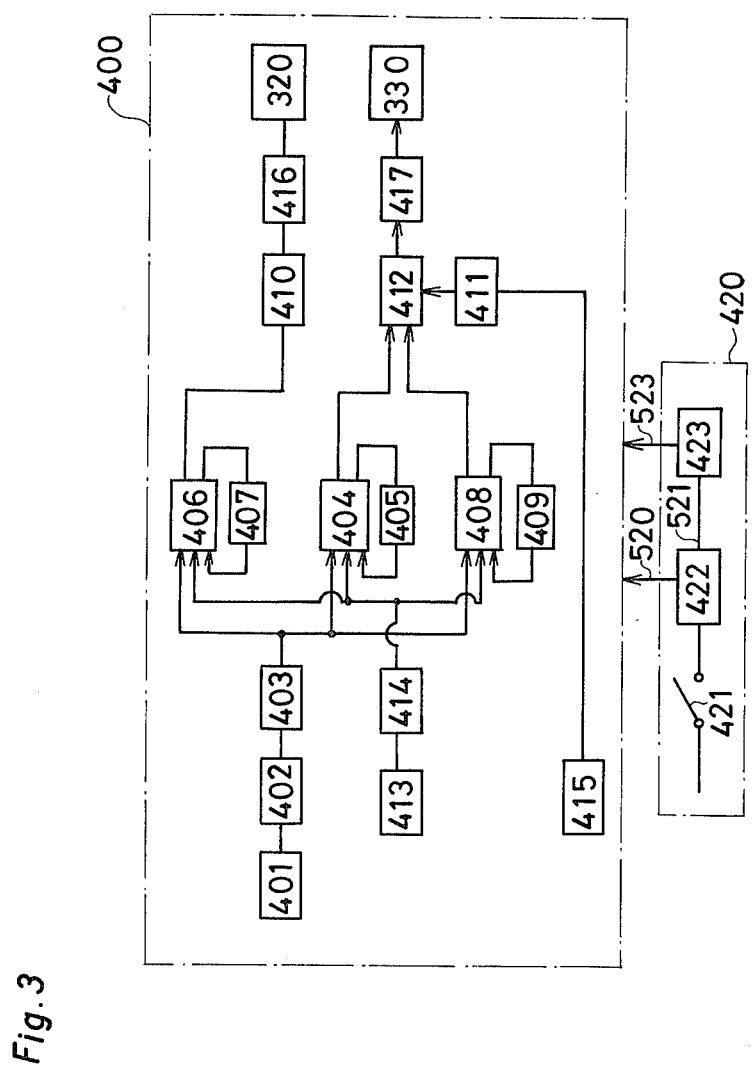
FIG. 3 is an electronics circuit diagram of the automatic transmission control apparatus according to the present invention.

The following describes the electronic circuit or computer shown in FIG. 3 which responds to changes in the vehicle running condition for controlling the operation of the first and second solenoid valves 320 and 330 as defined in the Table 3.

The electronics circuit generally includes a power supply circuit 420, and a computer circuit 400 which includes vehicle-speed and throttle-position sensing devices as an input section and a drive output section for the solenoid valves 320 and 330, including other intermediate circuit elements to later be described in detail. A switch 421 in the power supply circuit 420 is connected to an external battery (not shown) and is also connected to a position switch 422 on a manual lever. The position switch 422 is selectively connected through a lead wire 520 to 0, 3, 2, L positioning mechanisms, and through a lead wire 521 to a constant voltage power supply 423 which provides constant voltage through a lead wire 523 to the circuit elements in the computer circuit 400. The computer circuit arrangement includes vehicle-speed sensor 401, reshaper 402, D-A (digital-analog) converter 403, throttle-position switch 413, throttle-position voltage generator 414, 1-2 shift discriminator 404, 2-3 shift discriminator 406, 3-4 shift discriminator 408, hysteresis circuits 405, 407, 409, valve control circuit 410 for solenoid valve 320, valve control circuit 412 for solenoid valve 330, N-R shift signal generator 415, timer 411, amplifiers 416, 417, and solenoid valves 320, 330. The vehicle-speed sensor 401 provides a sine wave signal in response to a vehicle speed, and the signal is fed to the reshaper 402 which reshapes it to a positive rectangular signal, which is applied to the D-A converter 403. The D-A converter provides a d.c. voltage signal whose magnitude depends upon the vehicle speed. The throttle position switch 413 detects engine loads, and includes a variable resistance which varies with the throttle positions. The switch provides an output signal which represents a throttle position, and the signal is delivered to the throttle-position voltage generator 414 which supplies the corresponding d.c. voltage. This voltage is applied to the 1-2 shift discriminator 404, 2-3 shift discriminator 406, and 3-4 shift discriminator 408. Each of the discriminators includes a differential amplifier, for example, which compares a vehicle-speed voltage signal and a throttle-position voltage signal to determine the 1-2 shift, 2-3 shift and 3-4 shift. The hysteresis circuits 405, 407 and 409 provide the respective downshifting conditions for the 2-1 shift, 3-2 shift and 4-3 shift, and permit the respective downshifting to be operated at a slightly lower shifting car speed than the corresponding shifting car speed for the upshifting course, thereby preventing a hunting in the gear shift range. The opening control circuit 410 for solenoid valve 320 provides output signal "0" (OFF) and output signal "1" (ON) depending on the output of the 2-3 shift discriminator. The output of the circuit 410, which is amplified by the amplifier 416, controls the solenoid valve 320 for opening or closing depending on the output level received. The opening control circuit 412 for solenoid valve 330 delivers output signal "0" and output signal "1" depending on the output of the 1-2 shift discriminator 404, the output of the 3-4 shift discriminator 408, and the output of the N-R shift signal generator which is fed through the timer 411 into the circuit 412. The output of the circuit 412 is amplified by the amplifier 417 for controlling the solenoid valve 330 for opening or closing.

As readily understood from the foregoing description, the automatic transmission control apparatus according to the invention includes a single dual sequence valve 340 which provides a timing control for the operation of the brakes $B_1$, $B_2$ and oneway clutch $F_1$, thereby controlling the timing of upshifting from first to second speed and downshifting from third to second speed.

Figure 4:
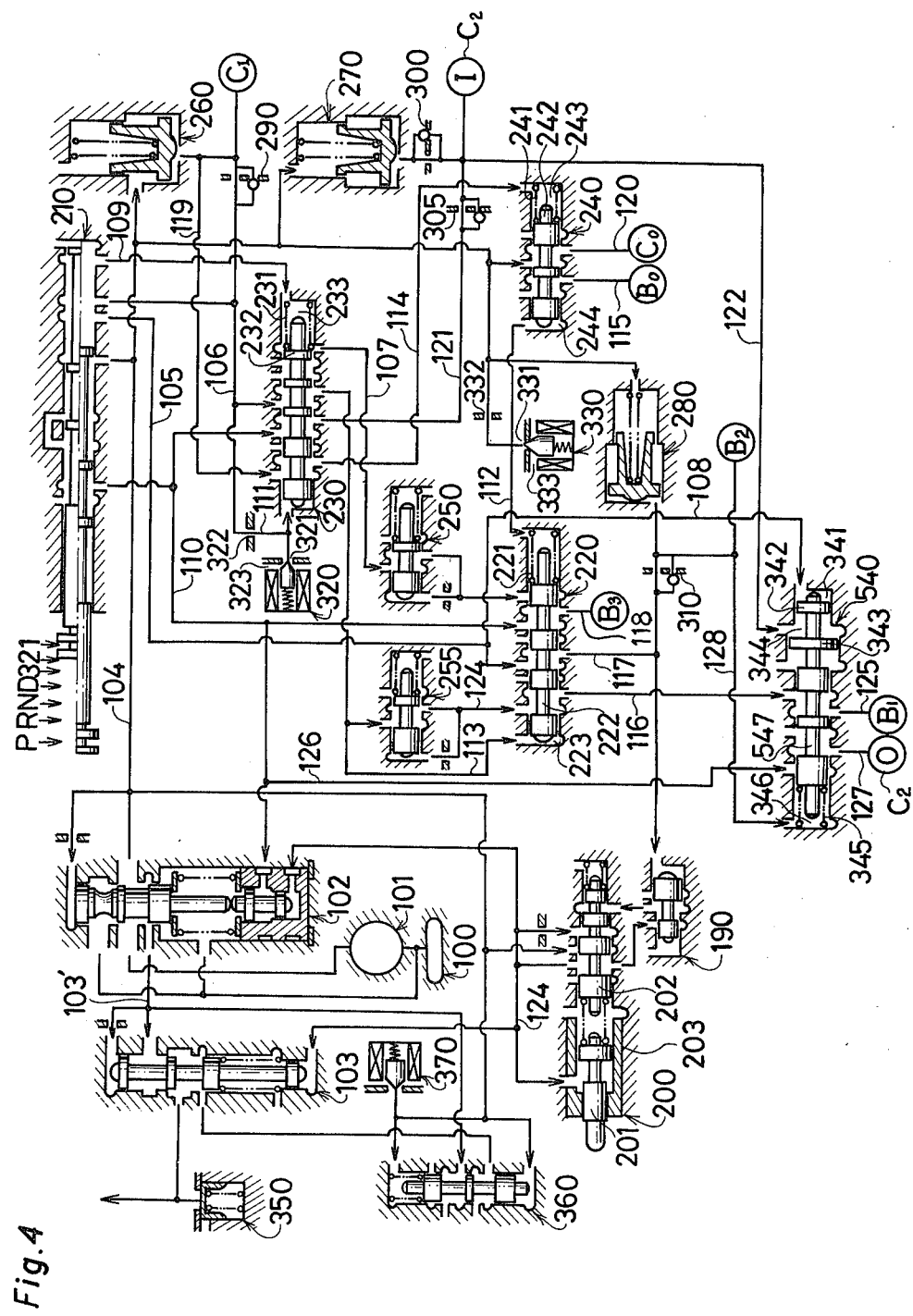
FIG. 4 in a hydraulic circuit diagram of the automatic transmission control apparatus according to another embodiment of the present invention.

The following description concerns a varied form of the apparatus described heretobefore, as shown in FIG. 4.

If a reverse multi-plate clutch $C_2$ within the automatic transmissions gear unit 3 is equipped with an inner piston I and an outer piston O which provide hydraulic servo functions, it is necessary to provide means to control the timing of the operation of the two pistons to permit a smooth gear engagement for shifting to reverse. In order to meet the above needs, therefore, the hydraulic circuit of the earlier embodiment includes an additional hydraulic circuit in which an oil passage 126 is provided as a branch from the oil passage 110, the branch 126 being linked to an oil passage 127 through a dual sequence valve 540 and to an outer piston O for the clutch $C_2$ linked to the above passage 127. In this varied embodiment, when the spool 547 of the dual sequence valve 540 is set to the left position in FIG. 4, the oil passage 126 is allowed to communicate with the oil passage 127, causing the outer piston O to operate. Setting the spool 547 to the right position allows the oil passage 127 to communicate to the drain port, thus preventing the outer piston O from operation. A flow control valve 305 is interposed between an oil passage 121 and an inner piston I for the clutch $C_2$.

The automatic transmission control apparatus according to the varied form of the invention provides additional functions, as follows. Manually shifting N to R first causes oil pressure to be routed through oil passage 110, 2-3 shift valve 230, oil passage 121 and flow control valve 305 into the inner piston I. Then, the oil pressure being introduced through oil passage 122 into the oil chamber 344 of the dual sequence valve 540 in rising. The increasing oil pressure causes the spool 547 in the valve 540 to be moved toward the left position, allowing the oil passages 126 and 127 to be communicated so that the outer piston O can be operated. As seen from the above, the dual sequence valve 540 can also provide timing control functions for operating the inner piston I and outer piston O for the clutch $C_2$.

Figure 5:
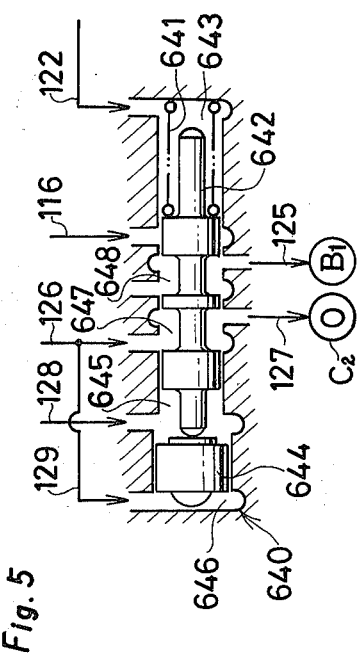
FIG. 5 shows the construction of the dual sequence valve according to a preferred embodiment of the present invention.

FIG. 5 is a further embodiment of the dual sequence valve generally shown by 640, the arrangement comprising a spool 642 backed by a spring 641, a right oil chamber 643 linked to the oil passage 122, another spool 644 having a land of greater diameter than the land of the spool 642 and disposed to make contact with the spool 642, an oil chamber 645 interposed between the spools 642 and 644 and linked to the oil passage 128, a left oil chamber 646 linked to a branch 129 of the oil passage 126, an oil chamber 647 between the lands on the spool 642, the oil chamber 647 allowing the oil passages 126 and 127 to be linked, and an oil chamber 648 allowing a link between the oil passages 116 and 125.

In accordance with the dual sequence valve 640, the upshifting from first to second speed is achieved such that that after the brakes $B_2$ have been engaged, oil pressure is introduced through the oil passage 128 into the oil chamber 645, and as it is gradually rising, the spool 642 is forced to be brought nearer to the right positions against the action of the spring 641, allowing the oil passages 116 and 125 to communicate with each other and thus engaging the brake $B_1$. The downshifting from third to second speed is done in this way, that is, after engaging the one-way clutch $F_1$ securely held by the brake $B_1$, the spool 642, which has been held in the left position by the component of the force of the $C_2$ inner piston pressure in the oil chamber 643 introduced through the third-speed oil passage 122, and the force of the spring 641, is then brought to the right position as the $C_2$ inner piston pressure in the chamber 643 is reduced, allowing the oil passages 116 and 125 to communicate and thus engaging the brake $B_1$. In the case of the reverse clutch $C_2$ provided with an inner piston I and an outer piston O, the shifting of N to R takes place in the following manner. After the inner piston I linked to the oil passage 121 has completed its operation, oil pressure is introduced into the oil chamber 643 through the oil passage 122, and as it is gradually rising, the component of the resilient force of the spring 641 and the force of the oil pressure in the chamber 643 overcome the force of the oil pressure in the oil chamber 646, permitting the spools 642 and 644 to be moved to the left position. The oil passages 126 and 127 are thus allowed to communicate with each other, causing the outer piston O to operate.

Figure 6:
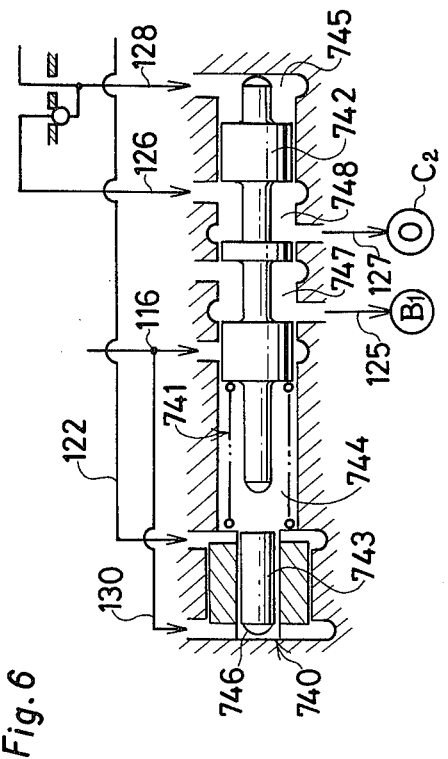
FIG. 6 shows the construction of the dual sequence valve according to another embodiment of the present invention.

FIG. 6 is a further preferred embodiment of the dual sequence valve which is generally shown by 740. The arrangement of the valve 740 comprises a spool 742 backed by a spring 741, a small diameter plunger 743 on the left side of the spool 742, an oil chamber 744 linked to the oil passage 122 and interposed between the spool 742 and the plunger 743, a right oil chamber 745 linked to the oil passage 128, a left oil chamber 746 linked to a branch 130 from the oil passage 116, an oil chamber 747 between the lands on the spool 742 and allowing a communication between the oil passages 116 and 125, and an oil chamber 748 allowing a communication between the oil passages 126' and 127.

In accordance with the dual sequence valve 740, for shifting of first to second speed, the oil pressure which has made the brakes $B_2$ engaged is then introduced through the oil passage 128 into the left oil chamber 745. The oil pressure gradually rising in the chamber 745 causes the spool 742 and plunger 743 to be moved to the left against the component of the resilient force of the spring 741 and the force of the oil pressure in the chamber 746 introduced through the oil passage 130. The oil passages 116 and 125 are thus communicated, allowing the brakes $B_1$ to be engaged. For 3-2 downshifting, after the one-way clutch $F_1$ has been engaged, the spool 742, which has been held in the right position by the $C_2$ clutch pressure in the oil chamber 744 introduced through the third-speed oil passage 122, is then brought to the left position as the $C_2$ clutch pressure is decreasing, allowing the oil passage 116 and 125 to be communicated and thus engaging the brakes $B_1$. For the reverse clutch $C_2$ which is equipped with an inner piston I and an outer piston O, upon completion of the inner piston operation, the cooperative action of the oil pressure in the oil chamber 744 introduced through the oil passage 122 and the spring 741 causes the spool 742 to be moved to the right position, communicating between the oil passages 126' and 127 and thus making the outer piston O operative.

The various embodiments of the control apparatus according to the present invention have been shown and described, and as it is readily understood from the foregoing description, a single dual sequence valve can perform the multiple timing control functions which have heretofore been made possible by using the two or more sequence valves. It is therefore advantageously possible to simplify the hydraulic circuit arrangement, and therefore reduce its manufacturing costs.

Although the present invention has been described with reference to the various embodiments thereof, it should be understood that various changes and modifications may be made within the spirit and scope of the invention.

What is claimed is:

1. A hydraulic control apparatus for an automatic transmission comprising:
   multi-speed shifting means which further comprises a plurality of planetary transmission gear sets and a plurality of friction engaging means for engaging or disengaging members of said gear sets so that at least three forward speeds and a reverse speed are accomplished, said forward speeds including a low speed, a middle speed and a high speed;
   a counter shaft being connected to one of said gear sets;
   a sun gear shaft adapted to be connected with said counter shaft;
   hydraulic control means for controlling, by way of engaging or disengaging, said friction engaging means in accordance with input signals to accomplish the forward multi-speeds and the reverse speed, the hydraulic control means including an oil pressure source and a plurality of shift valves for accomplishing said speeds by selectively feeding and exhausting oil pressure from said oil pressure source to said friction engaging means in response to input signals of vehicle running conditions comprising vehicular speed and throttle openings, wherein said plurality of friction engaging means includes a first and second friction engaging means, a one-way clutch and a third friction engaging means adapted to be connected with said sun gear shaft and with said one-way clutch, said one-way clutch and said third friction engaging means being connected parallel with the second friction engaging means between common members;
   said low speed being accomplished by disengaging said first, second, and third friction engaging means and said one-way clutch;
   said middle speed being accomplished by engaging at least one of the second friction engaging means and the third friction engaging means with the one-way clutch;
   said high speed being accomplished by engaging the first friction engaging means, and
   said hydraulic control means further including sequence valve means for receiving a first engaging oil pressure and for controlling, by alternately feeding and exhausting, a second engaging oil pressure to engage or disengage said second friction engaging means, said sequence valve being fluidically connected to first and second of said plurality of shift valves, and including first and second valve elements; first, second and third oil passage means operatively connected to said sequence valve; said sequence valve means including a first oil chamber in which said first valve element is pushed so as to feed, via said first oil passage means, the second engaging oil pressure to the second friction engaging means by applying a third engaging oil pressure via said second oil passage means, said third engaging oil pressure controlling the third friction engaging means so as to be engaged or disengaged; a second oil chamber in said sequence valve in which said second valve element is pushed towards releasing the second friction engaging means upon exhausting the second engaging oil pressure by applying via said third oil passage means the first engaging oil pressure, wherein said first engaging oil pressure controls the first friction engaging means to be engaged or disengaged, and biasing means in said sequence valve for biasing the valve element in a direction for exhausting the second engaging oil pressure; and wherein upon shifting from the low speed to the middle speed, the valve element of said sequence valve is urged in a direction for feeding the second engaging oil pressure to said second friction engaging means when the third engaging oil pressure has arrived at a predetermined level permitting the third friction engaging means to engage, and upon shifting from the high speed to the middle speed the valve element is urged in a direction for feeding the second engaging oil pressure to said second friction engaging means when the first engaging oil pressure has arrived at or below a predetermined level permitting said first friction engaging means to release when said one-way clutch has locked, such that engagement of the second friction engaging means is delayed.

2. A hydraulic control apparatus for an automatic transmission comprising:

multi-speed shifting means which further comprises a plurality of planetary transmission gear sets and a plurality of friction engaging means for alternately engaging and disengaging members of said gear sets so that at least three forward speeds and a reverse speed are accomplished, said forward speeds including a low speed, a middle speed and a high speed; and a counter shaft connected to one of said plurality of gear sets;

a sun gear shaft adapted to be connected with said counter shaft, hydraulic control means for controlling, by way of engaging and disengaging, said friction engaging means in accordance with input signals to accomplish the forward multi-speeds and the reverse speed, the hydraulic control means including an oil pressure source a plurality of shift valves and a manual shift valve for accomplishing said high, middle, low or reverse speeds by selectively feeding and exhausting oil pressure from said oil pressure source to said friction engaging means in response to vehicular speed and throttle position input signals indicating vehicle running conditions, wherein said plurality of friction engaging means includes a first and a second friction engaging means adapted to be connected with said counter shaft and said sun gear shaft, respectively, a one-way clutch, a third friction engaging means adapted to be connected with said sun gear shaft and with said one-way clutch, said one-way clutch and said third friction engaging means being connected parallel with the second friction engaging means between common members, and said first friction engaging means adapted to be connected with said sun gear shaft for the reverse speed to be alternately controllably engaged and disengaged, said first friction engaging means further comprising inner and outer pistons, respectively, for obtaining reverse speed;

said low speed being produced by disengaging said first, second and third friction engaging means and said one-way clutch;

said middle speed being produced by engaging at least one of said second friction engaging means and said third friction engaging means with said one-way clutch;

said high speed being produced by engaging said first friction engaging means and disengaging said second friction engaging means; and said reverse speed being produced by engaging said first friction engaging means upon disengaging said second and third friction engaging means;

wherein said hydraulic control means further includes sequence valve means for receiving first, second, third, and fourth engaging oil pressures and for controlling, by alternately feeding and exhausting, said second engaging oil pressure to engage and disengage said second friction engaging means, and said fourth engaging oil pressure to engage and disengage said first friction engaging means for reverse speed, said dual sequence valve means being fluidically connected to first and second of said plurality of shift valves and including first and second valve elements; first, second, third and fourth oil passage means operatively connected to said sequence valve means; a first oil chamber in which said first valve element is receivable so as to alternately feed via said first and fourth oil passage means said second and fourth engaging oil pressures, said second engaging oil pressure being applied to said second friction engaging means and said fourth engaging oil pressure being applied to a hydraulic servo of said outer piston in said first friction engaging means, respectively, by said third engaging oil pressure being alternately applied and exhausted via said second oil passage means for controlling the engagement and disengagement of said third friction engaging means; a second oil chamber in which said valve element is received by applying said first engaging oil pressure controlling the engagement and disengagement of said inner piston of said first friction engaging means via said third oil passage means thereby releasing said second friction engaging means by exhausting said second engaging oil pressure and engaging said outer piston of said first friction engaging means by supplying said fourth engaging oil pressure, and biasing means for biasing said first valve element in a direction for exhausting said second engaging oil pressure and for feeding said fourth oil pressure to said hydraulic servo of said outer piston, and wherein upon shifting from said low speed to said middle speed said first valve element is urged in a direction for feeding said second engaging oil pressure to said second friction engaging means when said third engaging oil pressure attains a first predetermined level to engage said third friction engaging means, wherein upon shifting from said high speed to said middle speed said first valve element is urged in a direction for feeding said second engaging oil pressure to said second friction engaging means when said first engaging oil pressure reaches a second predetermined level to release a hydraulic servo of said inner piston of said first friction engaging means and said one-way clutch has locked, such that engagement of said second friction engaging means is delayed, and on shifting from a neutral or parking position to said reverse speed said first valve element is actuated to feed said forth engaging oil pressure to said outer piston when said first engaging oil pressure applied to said inner piston reaches a third predetermined level actuating said inner piston such that said outer piston is subsequently actuated.

3. The hydraulic control apparatus as defined in either of claims 1 or 2, wherein said first friction engaging means further comprises a clutch.

4. The hydralic control apparatus as defined in either of claims 1 or 2, wherein said second and third friction engaging means further comprise brakes.

5. The hydralic control apparatus as defined in claim 2, wherein said first friction engaging means further comprises a fourth friction engaging means for the reverse speed.

6. The hydraulic control apparatus as defined in either of claims 1 or 2, wherein said biasing means further comprises a third oil chamber in from which said valve elements are normally pushed against the direction applied by the third engaging oil pressure fed to the first oil chamber.

7. The hydraulic control apparatus as defined in claim 6, further comprising a spring biasing said valve elements towards one direction wherein said first valve element further comprises a first piston portion to which the oil pressure supplied to the third friction engaging means is applied towards said one direction, and said second value element comprises a second piston portion having a prescribed larger area than the first piston portion wherein the oil pressure supplied to the first friction engaging means is applied to the second piston portion against said one direction.

8. The hydraulic control apparatus as defined in either of claims 1 or 2, wherein said multi-speed shifting means further comprises an input shaft, a first and a second planetary gear set, and an output shaft connected with a ring gear of the first planetary gear set and a carrier of the second planetary gear set, said input shaft being connected with a ring gear of the second planetary gear set through a clutch and with a sun gear shaft through the first friction engaging means, said sun gear shaft being connected with the second friction engaging means and with the third friction engaging means through said one-way clutch, and a carrier of the first planetary gear set being connected with a brake and fixed via a one-way clutch.

* * * * *